UNITED STATES PATENT OFFICE.

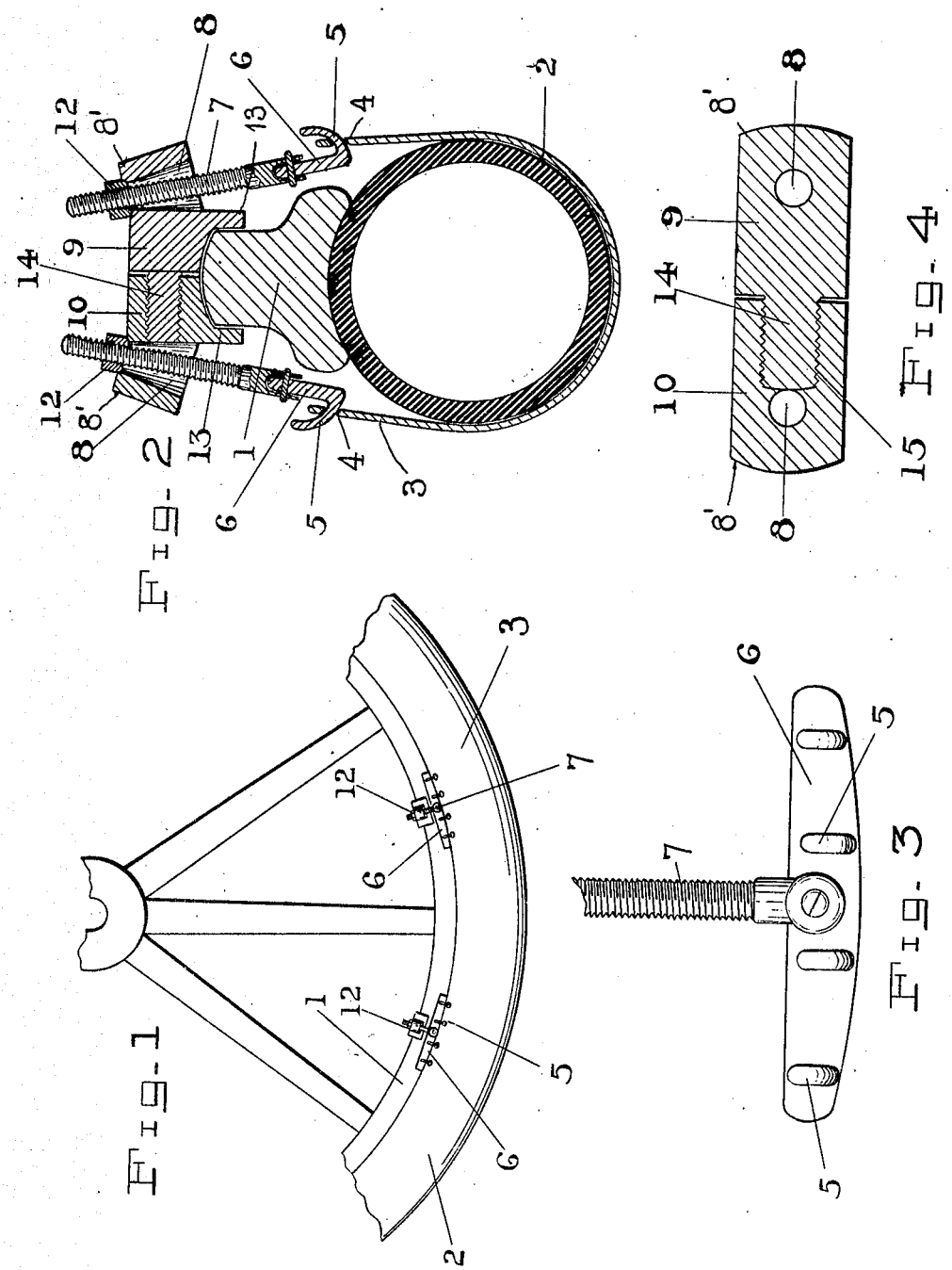

ROY HUNT MORRIS AND ELVIN E. TOWNSEND, OF OAKLAND, CALIFORNIA.

FASTENING DEVICE FOR PNEUMATIC-TIRE PROTECTORS.

No. 872,246.    Specification of Letters Patent.    Patented Nov. 26, 1907.

Application filed June 28, 1906. Serial No. 323,833.

*To all whom it may concern:*

Be it known that we, ROY HUNT MORRIS and ELVIN E. TOWNSEND, citizens of the United States, residing at Oakland, in the county of Alameda and State of California, have invented certain new and useful Improvements in Fastening Devices for Pneumatic-Tire Protectors; and we do declare the following to be a full, clear, and exact description of the invention, such as will enable others skilled in the art to which it appertains to make and use the same.

This invention relates to improvements in adjustable tire protector fastening devices.

The object of the invention is to provide an attaching device for pneumatic tire protectors having means whereby the same may be adjusted for connection with various sizes of wheel rims, and means whereby the protector may be drawn and held around the tire, said fastening device being constructed to permit the application of the protector while the tire is inflated.

With the above and other objects in view, the invention consists of certain novel features of construction, combination and arrangement of parts, as will be hereinafter described and claimed.

In the accompanying drawings:—Figure 1 is a side view of a portion of a wheel rim and tire, showing the application of the protector and the fastening devices thereto; Fig. 2 is a vertical, cross sectional view of the same; Fig. 3 is an enlarged detail view of one of the adjusting bolts and connecting plates; and Fig. 4 is a detail sectional view through the rim engaging or clamping blocks.

Referring more particularly to the drawings, 1 denotes the rim, and 2 denotes the tire, which is here shown as a pneumatic tire. Adapted to be applied to the tread and sides of the tire is a protecting strap or sheet 3, which may be formed of any suitable material. The sheet or strip 3 is provided at intervals along its upper edge with apertures 4, which are adapted to be engaged by hooks 5 formed on and projecting laterally from the outer side of connecting or holding plates 6.

The plates 6 are pivotally mounted midway between their ends in the bifurcated lower end of adjusting bolts 7, the upper ends of which project through conical-shaped holes 8 formed in ears 8' on the attaching blocks 9 and 10. The upper ends of the bolts 7 are provided with adjusting nuts 12, the lower sides of which are preferably convex to fit and readily turn in the upper concave ends of the holes 8 in the blocks 9 and 10.

The blocks 9 and 10 are provided on their outer sides with longitudinally - disposed flanges 13, which when the blocks are brought together form a rectangular passage or recess into which the inner edge of the wheel rim 1 projects when the blocks are applied thereto. The block 9 is formed with a laterally-projecting threaded lug or stud bolt 14, which is adapted to be screwed into a threaded aperture 15 formed in the adjacent block, thereby securely clamping the two blocks together upon the opposite sides of the rim and providing for the adjustment of the blocks to fit any width of rim.

By means of an attaching device or fastener constructed as herein shown and described, the protecting strip or sheet of the tire may be securely held in place and stretched around a tire after the same has been arranged in place and by keeping the nuts 12 tight, the protecting strip will be kept stretched and held in place.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described our invention, what we claim as new and desire to secure by Letters-Patent, is:—

1. In a fastening device for pneumatic tire protectors, a pair of blocks, each provided with a perforated ear and a longitudinally disposed flange, said perforations being conical, and the flanges being opposite each other, whereby a recess is formed between the flanges when the blocks are in position, one of said blocks being provided with a transverse screw-threaded aperture, and the other one with a screw-threaded lug adapted to fit in said aperture and hold said blocks together with said flanges in engagement with the rim of a wheel when in position, a nutted bolt through each ear and a hooked plate pivotally secured to the lower end of said bolt adapted to receive the perforated edge of the tire protector.

2. In a fastening device for pneumatic tire protectors, a pair of blocks, each provided with a perforated ear and a longitudinally disposed flange, said perforation being conical below and concave on top and the flanges being opposite each other, whereby a recess is formed between the flanges when the blocks are in position, one of said blocks being provided with a transverse screw-threaded aperture and the other one with a threaded lug adapted to fit in said aperture and hold said blocks together with their flanges in engagement with the rim of a wheel, a bolt through the perforation in each ear, the nut of which is convex on its under side and the lower end of the bolt is bifurcated, and a plate pivotally secured in each bifurcation provided with hooks for engaging with the perforated edge of the protector.

In testimony whereof we have hereunto set our hands in presence of two subscribing witnesses.

ROY HUNT MORRIS.
ELVIN E. TOWNSEND.

Witnesses:
 WALTER E. RODE,
 R. H. CROSS.